United States Patent Office 3,537,235
Patented Nov. 3, 1970

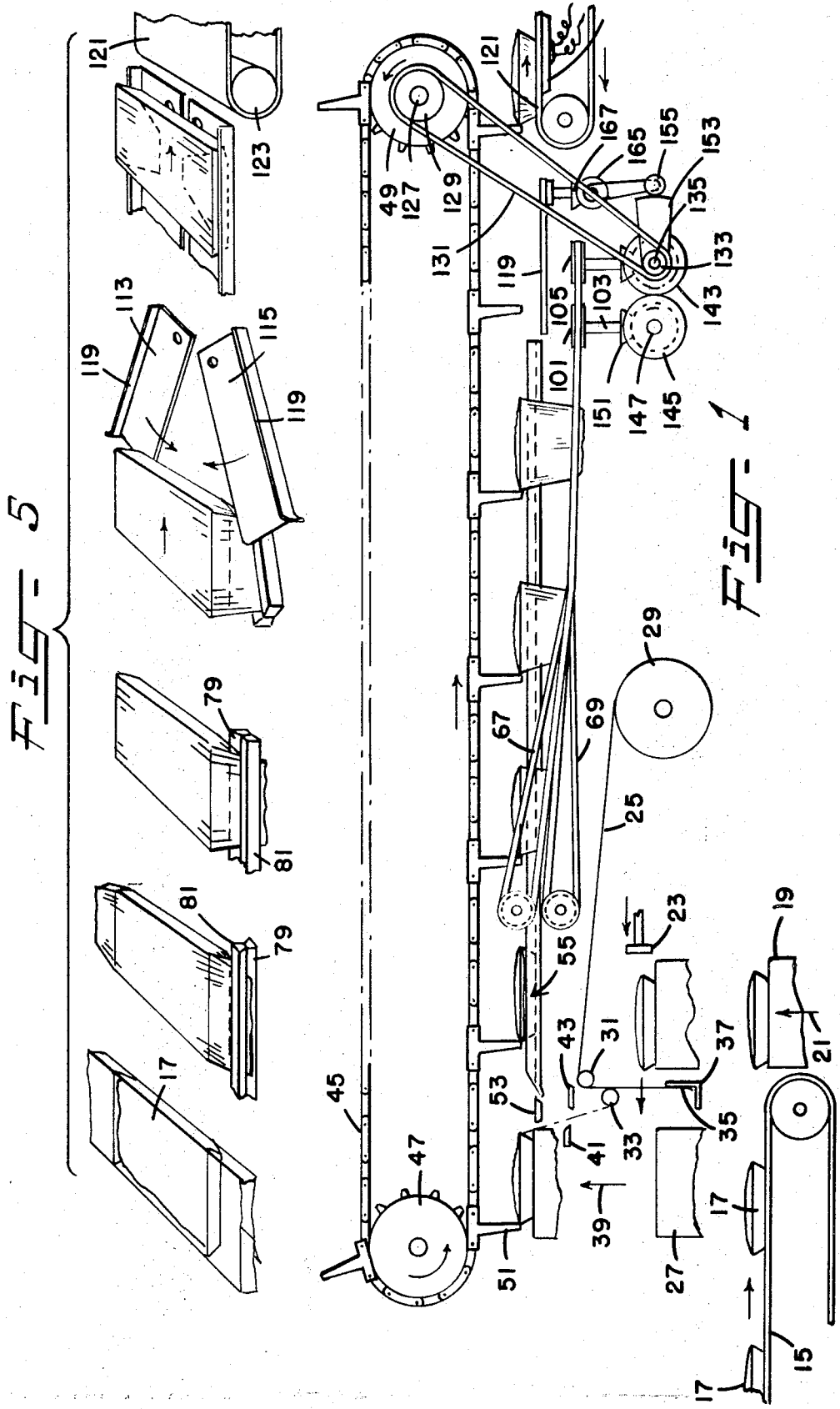

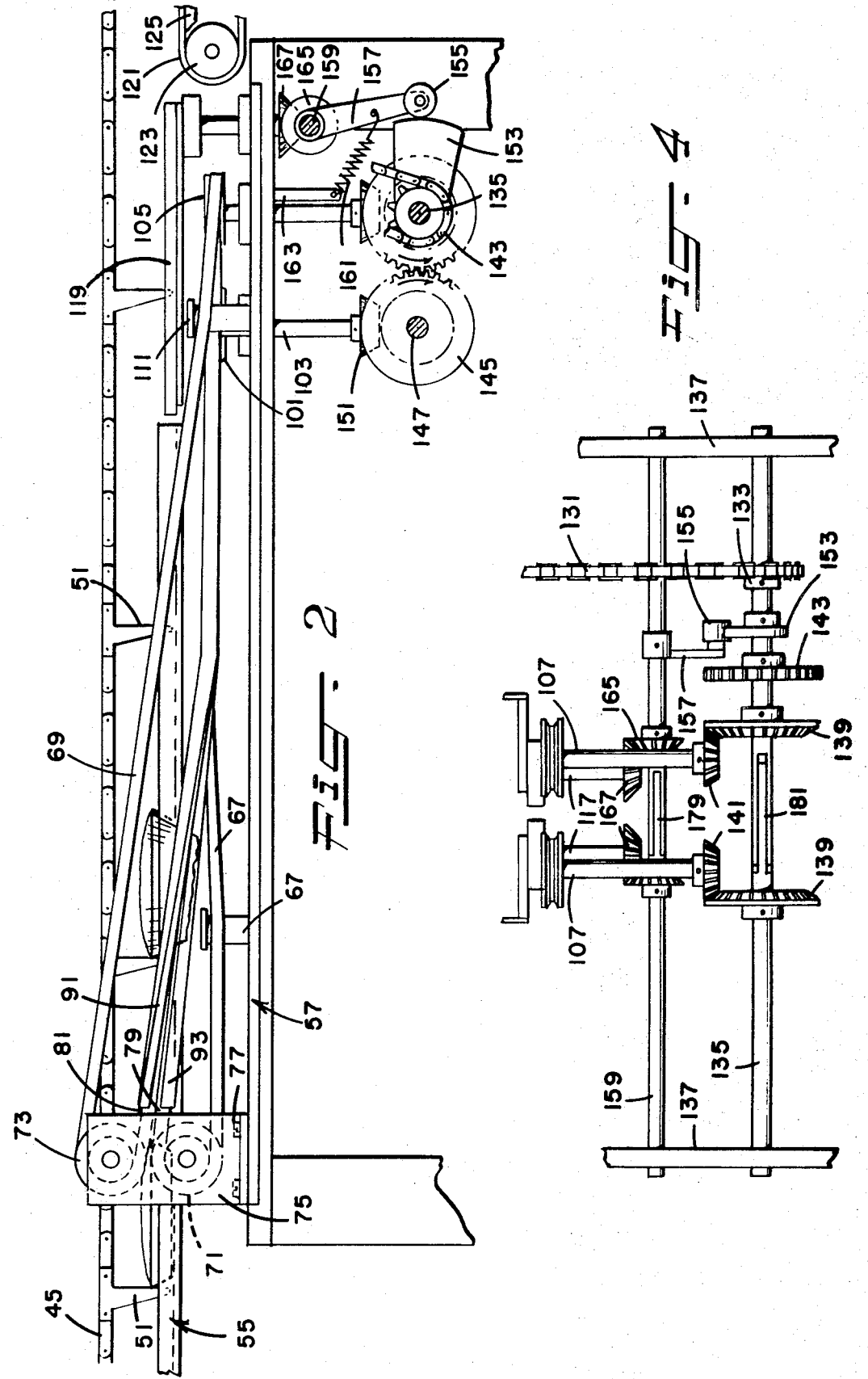

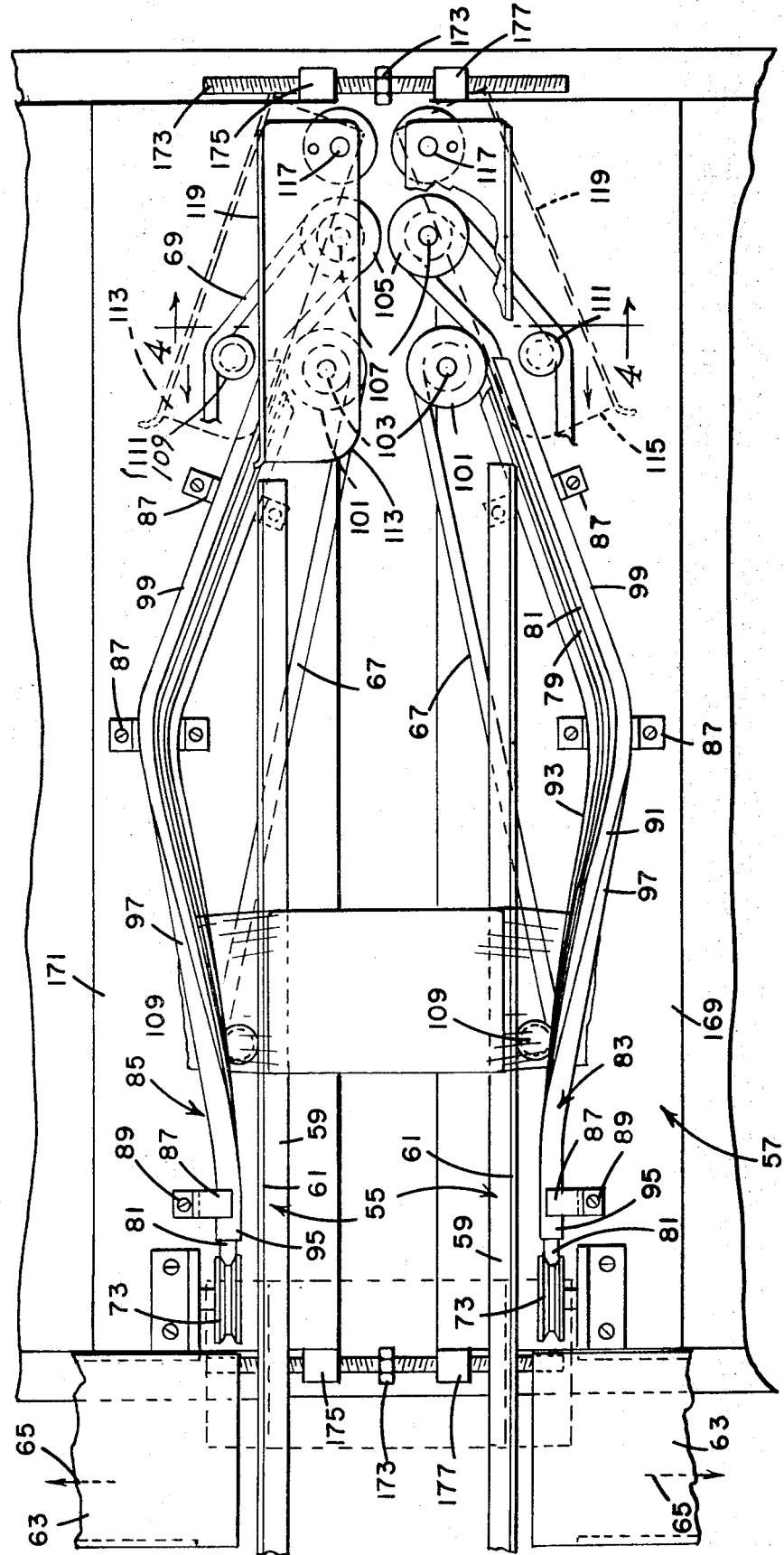

3,537,235
ARTICLE WRAPPING APPARATUS
Carl R. Pepmeier, Fredericksburg, Va., and Louis E. Stoffregen, Springfield, and Joseph T. Sincavage, Media, Pa., assignors to FMC Corporation, Philadelphia, Pa., a corporation of Delaware
Continuation-in-part of application Ser. No. 628,978, Apr. 6, 1967. This application Feb. 17, 1969, Ser. No. 805,944
Int. Cl. B65b 51/10
U.S. Cl. 53—379                  10 Claims

ABSTRACT OF THE DISCLOSURE

Article wrapping apparatus in which a heat-sealable, stretchable film is encircled about an article as a tube, stretched by gripping and applying tension to its edge portions, after which its edge portions are folded onto the wrapped article and sealed in place.

---

This application is a continuation-in-part of United States patent application Ser. No. 628,978, filed Apr. 6, 1967.

The present invention is directed to an apparatus for wrapping articles in stretchable films.

Shrink films have been in common use in wrapping of various articles. Such films are enveloped about the article to be wrapped and then passed through a heated chamber where they are shrunk tightly into conformity with the encased article. Control must be exercised in the application of heat to the various portions of the film to avoid non-uniform shrinkage and/or melting of the film. Such heat control is especially important when shrinking films onto articles of irregular shape. A further difficulty which is encountered with the use of shrink films is that the areas of the film which are in contact with the article do not shrink to the same extent as the free film areas, thus causing the shrunk film wrapper to assume a strained and somewhat wrinkled appearance.

In view of the above-noted and other problems, heat shrinkable films have been replaced in many wrapping applications by heat-sealable films which can be stretched into general conformity with the article which is to be wrapped. In wrapping articles with stretchable films, as for example, polyvinyl chloride, a desired length of film is encircled about an article with its edge portions extending outwardly beyond the opposite ends of the article itself. A stretchable film readily clings to itself and thus, once encircled about an article and overlapped at its ends, it remains adequately secured throughout the remaining manipulative operations. Generally, the projecting edge portions of such film are sequentially pulled outwardly away from the article, to thereby stretch the film, and are then folded onto the article and sealed in place. Heat is generally used only for the final sealing of the film edge portions so that no serious heat or temperature control problems are involved.

Equipment is lacking for effecting stretching of a film which has been encircled about an article as a tube, either manually or by a machine. Various apparatus is available for encircling a length of conventional shrink film about an article as a tube, and such apparatus could be conceivably used with stretchable films. However, manual operations would still be required for completing the article wrapping with such stretchable film. Manual wrapping operations are, of course, time consuming and, therefore, costly. These manual operations involve the stretching of the film, which has been encircled about the article which is to be wrapped, generally by pulling the projecting edge portions of the stretchable film, and then sealing the same.

Usually, and especially in the case of large or bulky articles, the partially wrapped article is held by the operator during film stretching so that the film areas which are actually gripped undergo little, if any stretching. Further, the necessary care and skill are not always exercised in manually stretching of the film and this often results in a wrapping having strained and weakened areas which may easily tear when subjected to the normal and expected handling, as by a purchaser. Accordingly, a primary object of this invention is to provide a generally new or improved and more satisfactory apparatus for wrapping articles in stretchable films.

Another object is to provide an apparatus which is simple, both in construction and use, for wrapping articles in stretchable film.

Still another object is the provision of an apparatus which encircles a heat-sealable stretchable film about an article, stretches and finally seals the same in place, generally automatically and with a minimum of supervision.

A further objective is to provide an apparatus in which a heat-sealable stretchable film, encircled about an article as a tube, either manually or by machine, is tensioned simultaneously in opposite directions to effect stretching thereof and is then sealed in place with no significant relaxation of the stretched portions thereof.

A still further object is the provision of an apparatus for wrapping articles of various sizes with stretchable films.

These and other objects are accomplished in accordance with the present invention by an apporatus in which a length of stretchable film is first encircled about an article as a tube, either manually or automatically by machine, with the film edge portions projecting outwardly beyond the opposite ends of the article itself. This now partially wrapped article is advanced along a path and separate means grip the portions of the film projecting beyond the opposite ends of the partially wrapped article. Means move the separate gripping means along paths which are angled relative to the path along which the partially wrapped article is advanced to thereby increase in length that portions of the film which extends between the separate gripping means. The projecting portions of the film are released from the separate gripping means at a location adjacent to a folding means, the latter of which serves to urge the projecting portions of the film onto the article.

In the preferred embodiment, the portions of the film projecting from the respective opposite ends of the partially wrapped article are each gripped by a separate pair of driven endless belts. More particularly, the edge portions of the film projecting beyond the ends of the article are each individually and simultaneously gripped between opposing and vertically aligned reaches of the pair of driven endless belts. With the film edge portions securely gripped therebetween, the pairs of belt reaches are guided along paths which diverge laterally relative to each other as well as vertically relative to the path along which the article is advanced. Since the film edge portions undergo no apparent slippage relative to the belts between which they are gripped, the portion of the film between such pairs of belts is tensioned and thus increased in length by stretching.

Concomitantly with the movement of the pairs of belts along their diverging paths, the respective pairs of belts are each gradually twisted so as to be disposed in side-by-side relationship substantially as stretching of the film is completed. This twisting of the individual pairs of belts, combined with their movement along paths which diverge relative to the path along which the partially wrapped article is advanced, urges the gripped edge portions of the film substantially 90° from their original positions. In effect, these combined movements of the pairs of belts initiate folding of the film along the ends of the article and place the film edge portions in proper positions for final folding onto the article itself.

After completing movement along their diverging paths, the pairs of endless belts, with the film edge portions still gripped therebetween, are guided along paths which converge relative to each other and which are at least parallel, and preferably diverge slightly, relative to the path of article advancement. Movement of the pairs of endless belts along their converging paths continues the folding of the film along the ends of the article. On the other hand, the diverging relationship of belts relative to the path of the article insures that the stretched film remains taut and thus compensates for any tendency for such film to shrink or relax.

As the pairs of endless belts approach the ends of their converging paths, the wrapped article is advanced relative to the free ends of the folding means, which include a pair of tuckers or plows disposed in converging relationship relative to the path of article advancement. As hereafter described in detail, the tuckers are pivotally supported at their ends remote from the gripping means so that their free ends may be pivoted toward each other. The tuckers remain stationary during movement of the wrapped article and, in view of their converging relationship, the opposing edges of the tuckers assist in continuing the folding of film about the article itself. As the wrapped article is advanced completely within the confines of the tuckers, the pairs of endless belts themselves complete their converging paths and release the film edge portion. The tuckers are now pivoted to swing their free ends toward each other and thus complete folding of the film so as to dispose its edge portions onto the wrapped article.

The article is advanced continuously throughout the wrapping operation and, if convenient, the tuckers may be heated to effect sealing of the film edge portions in their folding positions. Alternatively, such sealing may be achieved after the wrapped article is advanced from the tuckers, as by a heated belt.

Preferably, the apparatus of the present invention is in the form of two interconnected, adjustable sections, each including a pair of gripping belts and its belt guiding means and one tucker plate. These interconnected sections are adjustable simultaneously laterally of the path of article advancement to thus facilitate the accommodation of articles of different widths.

The above-described apparatus may be employed with films which exhibit a relatively small degree of stretch, such as cellophane, but is particularly well adapted for use with films which yield readily when tensioned. While the apparatus of this invention is not dependent upon any particular stretchable film, excellent results have been obtained using commercially available heat-sealable polyvinyl chloride films.

For a greater understanding of this invention, reference is made to the following detailed description and drawing in which FIG. 1 is a diagrammatic side view of the preferred embodiment of the apparatus of the present invention with portions thereof being removed;

FIG. 2 is a view similar to FIG. 1 showing a portion of the apparatus on an enlarged scale;

FIG. 3 is a top view of the apparatus shown in FIGS. 1 and 2, with a portion thereof being removed;

FIG. 4 is a vertical section taken through the apparatus generally along the line IV—IV of FIG. 3; and FIG. 5 is an expanded view diagrammatically illustrating various steps of article wrapping by the apparatus of the present invention.

As heretofore mentioned, the apparatus of the present invention is adapted to stretch and complete the wrapping of stretchable films which have been manually applied to articles, but is especially suited for use with conventional equipment which is capable of encircling, as a tube, a length of stretchable film about an article to be wrapped. Such conventional equipment is diagrammatically illustrated in FIG. 1 and includes a conveyor 15 which delivers unwrapped articles 17 individually onto a platform 19. As indicated by arrow 21, the platform 19 is movable vertically and, in its uppermost position, is aligned with a plunger 23 which serves to move an article 17 from the platform 19, across the path of a stretchable film 25, such as stretchable and heat-sealable polyvinyl chloride film, and onto a platform 27. The film 25 is supplied in the form of a roll 29 and is laced between guide rollers 31 and 33, with its leading end 35 maintained in a desired path by a fixed member 37. The stretchable film 25, as heretofore described, tends to cling to itself, as well as to elements of the apparatus with which it may contact, and thus its leading end readily attaches itself to the member 37 and thus remains in its desired path or location as illustrated.

As the article 17 is moved from the platform 19 and against the film 25, it is partially encircled by the film 25. Once the article 17 is received on the platform 27, the film extends from beneath the article and across a portion of its top face. The platform 27 is also movable vertically, as indicated by arrow 39, and when in its uppermost position, the film 25 covers the top face of the article and assumes a path as indicated by broken lines in FIG. 1. The length of film which is necessary for completely wrapping the article is then severed from the supply roll by a cooperating blade 41 and anvil 43. The newly formed leading end of the film 25 falls or is moved away from the anvil 43 and assumes a position against the member 37 as heretofore described, while the trailing end of the severed length of film merely hangs down from the partially wrapped article.

A driven endless chain conveyor 45, which forms a part of the apparatus of the present invention, is laced about sprockets 47 and 49 and extends over the platform 27 and the partially wrapped article which is supported thereon. A series of arms 51 project from the chain conveyor 45 at spaced intervals and serve to individually and continuously advance partially wrapped articles from the platform 27 and through the remainder of the wrapping apparatus, as more fully described hereinafter.

During initial movement from the platform 27, the partially wrapped article 17 travels over a fixed plate 53 which sweeps the trailing end of the several length of film beneath the article and into overlapping relationship with the leading end thereof. If necessary, this plate 53 may be heated. With continued movement, the partially wrapped article is received on and between a pair of generally straight and preferably horizontally disposed angle bar guides 55. At this stage, the severed length of film is completely encircled about the article 17 as a tube, with its edge portions projecting beyond the ends of the article itself.

The guide bars 55 are fixed by brackets to a supporting table, indicated generally at 57, and include horizontal flanges 59 along which the partially wrapped articles ride as they are continuously advanced by the conveyor 45, and vertical flanges 61 which prevent lateral movement of such articles from their intended straight path. Desirably, the guide bars 55 are either constructed of, or at least coated with, polytetrafluoroethylene (Teflon), or like material, to insure smooth and free sliding movement of the partially wrapped articles relative thereto.

Normally, when the partially wrapped articles are received on the guide bars 55, the projecting film edge portions extend generally horizontally from the opposite ends of the respective articles. If desired, vacuum chambers 63 may be disposed adjacent to the initial portions of the guide bars 55 to insure that the film edges assume such outwardly projecting positions. The chambers 63 are connected to a suitable evacuating means, as indicated by the arrows 65 and, as shown in FIG. 3, the top and bottom walls extend beyond the side walls thereof so as to provide an unobstructed passage for the film edges as the partially wrapped articles are advanced relative thereto.

Once the partially wrapped articles are advanced past the vacuum chambers 63, the projecting film edge portions are each gripped between a separate pair of driven endless belts 67 and 69, as they travel over pulleys 71 and 73. The pulleys for both pairs of gripping belts are supported by brackets 75, which are bolted at 77 to the table 57, and direct the opposing reaches 79 and 81 of such pairs of belts along generally parallel paths as they move into gripping engagement with the projecting film edge portions.

With the film edge portions securely gripped therebetween the opposing reaches of the pairs of belts enter guides 83 and 85 which are supported by brackets 87 bolted to the table 57 at 89. The guides 83 and 85 are of similar construction, each including a pair of opposed spaced channels 91 and 93 between which the opposed reaches 79 and 81 of the respective pairs of belts are slidably advanced. Rollers may be provided within the channels 91 and 93 to facilitate smooth travel of the belt reaches therethrough. The entrance sections 95 of the guides 83 and 85 are disposed in a plane which diverges relative to the plane of the guide bars 55 and are substantially parallel to each other. Along these sections 95, the channels 91 and 93 of the respective guides, and thus portions of the belt reaches within such sections, are disposed in vertically aligned relationship.

Beyond the sections 95, the guides 83 and 85 include intermediate sections 97 which are in the same plane of the sections 95 but which diverge relative to each other. Along each of the guide sections 97 the channels 91 and 93 are twisted or spiralled so as to gradually urge the opposing belt reaches 79 and 81 into a side-by-side relationship as they travel therethrough and enter into the guide exit secitons 99. Throughout the guide exit sections 99 the channels 91 and 93 remain in side-by-side relationship. However, the sections 99 of the respective guides 83 and 85 converge relative to each other and together lie in a plane which is generally parallel, and preferably diverges relative to the horizontal path along which the articles are advanced. Of further significance, and as more fully described hereafter, the ends of the guide sections 99 terminate below but within the confines of the horizontal path of the advancing articles.

Stretching of the film which has been encircled about the article and gripped at its edge portions by the pairs of endless belts occurs as the opposing reaches of such belts enter and travel along the diverging intermediate sections 97 of the guides 83 and 85. This stretching of the film is gradual as the partially wrapped article and opposed belt reaches travel relative to the guide sections 97 and is substantially completed as the belt reaches approach and enter the guide exit sections 99. The twisitng or spiralling of the opposed belt reaches as they travel through the guide sections 97 assists in stretching of the film but, more important, initiates folding of the film along the ends of the partially wrapped article. This folding of the film about the ends of the article is continued as the opposing belt reaches 79 and 81 travel along the converging exit sections 99 of the guides 83 and 85. The diverging relationship of the guide sections 99 relative to the horizontal path of the articles maintains the stretched film taut as its edge portions are drawn in towards the article and thus film relaxation or shrinkage is prevented.

As heretofore mentioned, the guide exit sections 99 terminate below and within the confines of the horizontal path along which the partially wrapped articles are advanced. The opposing reaches 79 and 81 of the pairs of endless belts issuing from the guide exit sections 99 continue along their converging paths for some distance after leaving the sections 99. As a result, the gripped edge portions of the film are carried well beneath the wrapped article before they are released from between the opposing belt reaches.

Release of the film edge portions occurs as the reaches 79 of the respective belts 67 engage and travel with driving pulleys 101 which are fixed to shafts 103 rotatably supported by the table 57. The reaches 81 of the remaining belts 69 continue to travel toward each other until engaging with and passing about driving pulleys 105. Shafts 107, to which the pulleys 105 are fixed, are also supported for rotation by the table 57 and are driven as hereafter described. After passing beyond the pulleys 101 and 105, the reaches of the respective belts 67 and 69 are spiraled, or untwisted, by idler pulleys 109 and 111, respectively, so that they may again assume their original vertically aligned relationship as they pass over pulleys 71 and 73.

Concomitantly with the movement of the opposing reaches of the pairs of endless belts 67 and 69 along those portions of the guide sections 99 which extend beneath the straight, horizontal path of the partially wrapped aricle, the article itself is advanced off from the guide bars 55 and onto the free ends of a pair of tuckers 113 and 115. At their opposite ends the tuckers 113 and 115 are fixed to shafts 117 which extend through and are pivotally or rotatably supported by the table 57.

As hereafter described, the shafts 117 are periodically rotated to swing the free ends of the tuckers 113 and 115 toward each other to complete the folding of the film edge portions onto the wrapped article. However, during advancement of the wrapped article onto the tuckers 113 and 115, the tuckers themselves are stationary and are disposed in converging relationship relative to the path of the article. In these positions of the tuckers 113 and 115, their opposed edges engage with the film edge portions and assist in urging the same snugly against the wrapped article.

As the film edge portions are released from between the opposing belt reaches, as heretofore described, the wrapped article is completely supported on the tuckers 113 and 115. At this time, the tuckers 113 and 115 are swung toward each other to complete the folding of the film edge portions against the wrapped article. The wrapped article is advanced continuously during the entire wrapping procedure and thus the outermost edges of the tuckers 113 and 115 are provided with lips 119 which serve to guide the wrapped article along a desired straight path.

Suitable heating means may be provided on the tuckers 113 and 115 for sealing the film edge portions in their folded positions as the wrapped article is advanced relative thereto. Alternatively, such sealing may be achieved after the wrapped article is advanced off from the tuckers and onto an endless belt 121 which is laced over pulleys, such as shown at 123, and travels over a hot plate 125.

While various arrangements may be employed in driving the different movable elements, in the apparatus described and illustrated, the conveyor 45 is advanced continuously and uniformly by driving shaft 127 of the sprocket 49 by a suitable motor, not shown. A smaller sprocket 129 is fixed to the shaft 127 and, when turned, drives a chain 131 which is laced about a sprocket 133 fixed to a shaft 135. Frame members 137 which form part of the table 57, support the shaft 135 for rotary movement.

Bevel gears 139 are fixed to the shaft 135 and mesh with bevel gears 141 which are locked onto the ends of the shafts 107 to thereby rotate the pulleys 105 and drive the endless belts 69 which are laced thereover. A pinion gear 143 is also fixed to the shaft 135 and meshes with a similar gear 145 which is pinned to a shaft 147. Frame members 137 also support the shaft 147 for rotatable movement. Bevel gears, similar to the gears 139, are fixed to the shaft 147 and mesh with bevel gears 151 which are locked to the shafts 103 to thereby rotate the pulleys 101 about which are laced the endless belts 67. The meshing pairs of bevel gears thus far described are of similar construction and are of such sizes as to insure that the endless belts 67 and 69 of both pairs of such belts are advanced at speeds which are equal to that of the conveyor 45.

The periodic movement of the tuckers 113 and 115 is also timed with the travel of the conveyor 45 to insure that they are swung toward each other only when a wrapped article is completely supported thereon. This movement of the tuckers 113 and 115 is achieved by a cam 153 which is fixed to the shaft 135. The cam 153 engages with a roller 155 carried at the free end of a wiper arm 157 which is fixed to a shaft 159. A tension spring 161 is connected to a lug 163, depending from the table 57, and the wiper arm 157 to maintain the roller 155 engaged with the cam 153, and as will be more apparent hereafter, to urge the tuckers 113 and 115 apart after their inward swinging movement.

As seen in FIG. 2, the cam 153 is shaped to impart an oscillating motion to the shaft 159 which is supported for turning movement by the frame members 137. Bevel gears 165, which are fixed to the shaft 159, mesh with bevel gears 167 locked to the ends of the shaft 117 to which the tuckers 113 and 115 themselves are fixed.

To accommodate articles of various widths, the table 57 is preferably formed of two sections 169 and 171, each of which includes a guide bar 55, a pair of endless belts 67 and 69 and the associated belt guides and driving means, a tucker, and its actuating means. Screws 173, threaded onto lugs 175 and 177, connect the table sections 169 and 171 and permit such sections to be adjusted laterally relative to the path of article advancement, as defined by the conveyor 45. As shown in FIG. 4, the various shafts of the belt and tucker drive means are splined, as shown at 179 and 181, to facilitate operation of the same regardless of the positions to which the table sections 169 and 171 may be adjusted.

While operation of the apparatus of the present invention is believed to be clear from the above description, reference is made to FIG. 5 of the drawing which illustrates various steps of the article wrapping procedure. Starting at the left end of FIG. 5, the article is shown as it travels beyond the vacuum chambers 63, with the necessary length of film being encircled about the article and with the film edge portions projecting outwardly from the ends of the article.

The opposing reaches 79 and 81 of the pairs of endless belts 67 and 69 then grip the projecting film edges. With the continued advancement of the partially wrapped article along the guide bars 55 and the travel of the belt reaches 79 and 81 along the guides 83 and 85, the film which extends about the article is stretched. Concomitantly with this stretching, folding of the film edge portions along the ends of the article is initiated. Once film stretching has been completed, folding of the film edges toward the article is continued as the opposing belt reaches move into converging relationship, until such film edges are released from between the pairs of endless belts and the article itself is supported on the tuckers 113 and 115. The film edge portions are urged snugly against the wrapped article as the tuckers 113 and 115 are swung toward each other and then heat sealed in place.

We claim:

1. Apparatus for wrapping an article with a length of stretchable film which has been encircled about an article with the edge portions of the film projecting outwardly beyond the opposite ends of the article which is to be wrapped including means for advancing the partially wrapped article along a path, separate means for gripping the portions of the film projecting beyond each of the opposite ends of the partially wrapped article, means for moving said gripping means along paths which are angled relative to the path along which the partially wrapped article is advanced to thereby increase in length that portion of the film which extends between said separate gripping means, means for folding the projecting portions of the film onto the article and means for releasing the projecting edge portions of the film from said separate gripping means at a location adjacent to said folding means.

2. Apparatus as defined in claim 1 wherein the means for advancing the partially wrapped article includes a pair of tracks along which the partially wrapped article is adapted to be moved, an endless conveyor, means for driving said conveyor, and an arm projecting from said conveyor and adapted to engage with and move the partially wrapped article along said tracks when said conveyor is driven.

3. Apparatus as defined in claim 1 wherein each of said separate gripping means includes a pair of endless belts having reaches disposed in opposing relationship and adapted to grip therebetween the film edge portions projecting beyond respective opposite ends of the partially wrapped article, and wherein said means for releasing the projecting ends of the film from said separate gripping means includes pulleys for directing opposing reaches of each pair of said endless belts along diverging paths.

4. Apparatus as defined in claim 3 wherein said means for moving said gripping means along their respective paths includes means for driving said endless belts and separate, continuous guiding means for together directing the opposing reaches of each pair of said endless belts along a path angled relative to the path along which the partially wrapped article is advanced.

5. Apparatus as defined in claim 4 wherein said separate guiding means have corresponding sections which are disposed in diverging relationship to each other and to the path along which the partially wrapped article is advanced and corresponding sections which are disposed in converging relationship to each other and in slightly diverging relationship relative to the path along which the partially wrapped article is advanced.

6. Apparatus as defined in claim 5 wherein the corresponding sections of said guiding means which ae disposed in divering relationship to each other are spiralled to twist the opposing belt reaches in unison from a vertically aligned relationship into a side-by-side relationship as such opposing belt reaches are moved therethrough.

7. Apparatus as defined in claim 5 wherein the corresponding sections of said guiding means which are disposed in converging relationship to each other terminate at locations adjacent to said pulleys and wherein said means for advancing the partially wrapped article includes a pair of tracks, said tracks terminating in advance of the ends of said converging sections of said guiding means.

8. Apparatus as defined in claim 2 wherein said folding means includes a pair of tuckers disposed beyond the ends of said tracks and in converging relationship relative to the path along which the article is advanced whereby the folding means receives the wrapped article as it leaves said tracks.

9. Apparatus as defined in claim 8 further including means pivotally supporting said tuckers at their ends remote from said tracks, means for moving the tuckers about their pivotal supporting means whereby the free ends of said tuckers are urged toward each other and means for sealing the edge portions of the film in place after they have been folded onto the wrapped article.

10. Apparatus as defined in claim 1 further including vacuum means positioned in advance of said gripping means for causing the edge portions of the film to project outwardly from the opposite ends of the article as the partially wrapped article is advanced toward the gripping means.

References Cited
UNITED STATES PATENTS

| | | | |
|---|---|---|---|
| 3,357,156 | 12/1967 | Glogowski | 53—378 |
| 3,371,466 | 3/1968 | Klopfenstein | 53—206 |

TRAVIS S. McGEHEE, Primary Examiner

U.S. Cl. X.R.

53—210